Patented Mar. 9, 1954

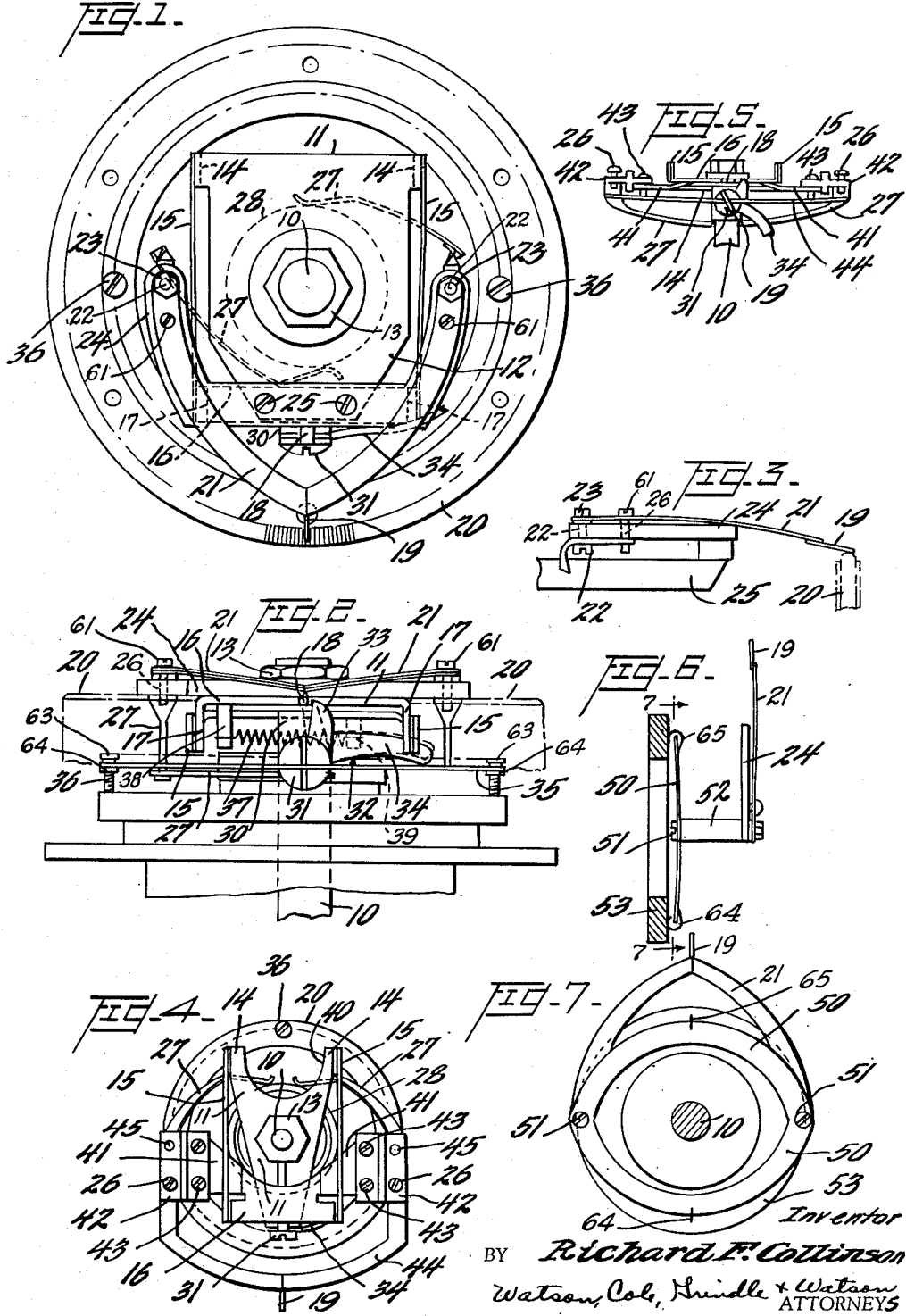

2,671,842

UNITED STATES PATENT OFFICE 2,671,842

VARIABLE ELECTRICAL IMPEDANCE COMPONENTS

Richard Francis Collinson, Romford, England, assignor to Colvern Limited, Romford, Essex, England, a British company Application January 24, 1951, Serial No. 207,527

Claims priority, application Great Britain January 24, 1950

7 Claims. (Cl. 201—48)

This invention concerns improvements in or relating to variable electrical impedance components incorporating a resistance or inductance track over which slides a wiper contact for varying the impedance of the component.

It is especially applicable to rotary wire-wound potentiometers and variable resistors of the type which includes a wire-wound former shaped to annular form and a concentric manually-operated spindle bearing a rotary wiper contact for sliding over the track presented by the wire winding on the former.

For certain purposes it is essential to have high accuracy for the potentiometer (or other electrical impedance component). A predetermined relationship between resistance and angular setting of the potentiometer spindle must be closely followed throughout the range of the degree scale. This relationship may be a straight-line relationship, in which the resistance is directly in proportion to the angular setting of the spindle, but the relationship may also be a curved-line relationship.

It has been so far found impossible to manufacture high accuracy potentiometers which are sufficiently accurate to be put into use without requiring correction of the resistance at different points of the scale after comparison of the potentiometer against the standard instrument. Inaccuracy can arise through variations in resistivity and cross-sectional area of the resistance wire, through variations in the former, and through lack of uniformity in the resistance-wire winding. Each potentiometer should therefore be capable of mechanical correction for these errors, so as to ensure that at all points on the scale the desired resistance value is obtained.

To enable such corrections to be made, potentiometers have been fitted with a correcting device for permitting manual correction of the resistance at different points on the scale.

One form of such correcting device that has been employed in a rotary potentiometer incorporates the combination of a support member mounted for rotation with the spindle, an angularly movable member so carried by the support member as to be capable of limited angular movement relatively to the support member in a plane substantially normal to the spindle axis, a wiper contact carried by the angularly movable member, a stationary cam ring arranged concentrically with the spindle, and a cam follower riding on the cam ring and connected between the angularly movable member and the support for producing an angular adjustment of the first member relatively to its support so as to advance or retard the wiper contact in accordance with the cam contour.

Devices of this type so far proposed have the disadvantage of involving the use of a substantial number of separate parts which thus with wear lead to the development of slackness, and thereby reduce the accuracy of the component.

One object of the invention is to provide the impedance component with an improved correcting device which is of simple construction involving relatively few separate parts and but one pivot or at least a few pivots.

According to the main feature of the present invention there is provided a variable electrical impedance component (i. e. a variable resistance or inductance or condenser) having a fixed part (e. g. resistance track or inductance track or a condenser plate) and a moving part (e. g. a wiper contact moving over the resistance or inductance track or a moving condenser plate) for altering the value of the component, comprising a mounting for the movable part of the component which is connected to a support fixed on a movable control member for imparting movement to the movable component part, the connection between the mounting and the support consisting of a flexible link which is fixed to the mounting and the support and is such as to permit limited advance or retard movement of the movable component part relatively to the control member, a cam track in parallel with the path of the support on the control member, and a cam follower carried by the support which rides along the cam track on movement of the control member and which is coupled to the mounting for the movable component part whereby the latter is advanced or retarded relatively to the control member in accordance with the cam contour.

A convenient construction of variable resistance or inductance accordance to the present invention may comprise the combination of an annular resistance or inductance track, a rotary wiper contact on a mounting connected to a support on a central control member in the form of a spindle for imparting a rotary movement of the slider contact to slide it around the resistance or inductance track, the connection between the mounting and the support consisting of a flexible link which is fixed to the two parts and which is such as to permit a limited angular advance or retard movement of the contact relatively to the spindle, an annular cam track concentric with the spindle, and a cam follower carried by the support on the spindle which rides along the cam track on rotation of the spindle and which is coupled to the wiper contact mounting whereby the wiper contact is advanced or retarded in accordance with the cam contour.

In the preferred construction, the flexible link is afforded by an assembly of a pair of spaced arms arranged side by side substantially in parallel, the assembly being rigidly fixed at one end to the support on the spindle (or other control member) and being spanned by a bridge member serving as a mounting for supporting the wiper contact (or other moving part of the component). The assembly of arms and bridge thus forms a parallel linkage. Spring means are advisably provided for returning the mounting for the movable part from an advanced or retarded position. The spring means may consist of a separate spring action on the bridge member. Alternatively, or in addition, the arms of the flexible link may be made resilient.

Several constructions of potentiometer in accordance with the present invention are illustrated by way of example in the accompanying drawings, in which—

Figures 1 and 2 are respectively plan and front views of one construction;

Figure 3 is a side view of the mounting for the wiper contact;

Figures 4 and 5 are respectively plan and side views of a second construction; and Figure 6 is a side view of a modified form of pick-up device for the second potentiometer; and Figure 7 is a bottom view on the line 7—7 of Figure 6.

The same references are used for like parts in the various views.

Referring first to the potentiometer shown in Figures 1 to 3, the potentiometer spindle 10 has fixed to it a rigid support plate 11 set at right angles to the axis of the spindle. This plate 11 is of substantially rectangular form with one end 12 tapered. In the plate is approximately a central hole that fits over the threaded end of the spindle. A nut 13 secures the plate on the spindle. On the sides of the plate at its back (i. e. the end remote from the tapered end 12) are a pair of down-turned parallel lugs 14. To these lugs are spot welded the ends of two flexible and resilient strip-metal arms 15 that extend substantially parallel at the sides of the plate 11. The outer ends of the flexible arms are spanned by a sheet-metal bridge plate 16 having down-turned parallel lugs 17 which are spot-welded to the other ends of the arms 15. On this bridge plate is formed an ear 18 that projects outwardly away from the spindle.

The bridge plate 16 serves as a mounting for a wiper contact finger 19 that is adapted to ride, on rotation of the spindle, over a resistance track at one edge of an annular wire wound former 20 (shown in chain lines) arranged concentrically with the spindle. The wiper contact 19 is fixed to the peak of a resilient strip-metal member 21 shaped approximately to the form of a wish-bone. The ends of the wish-bone are fixed by bolts 22 and nuts 23 to the ends of a yoke 24 of insulation material screwed at 25 on top of the bridge member 16. The wish-bone acts to hold the wiper 19 resiliently in contact with the resistance track.

The bolts 22 and nuts 23 also act to secure two cranked brackets 60 at the underside of the yoke 24. On each bracket is fixed one end of a spring pick-up arm 27 which slides over the cylindrical surface of a slip ring 28 concentric with and insulated from the spindle 10. Screws 26 pass through registering holes in the spring wish-bone 21 and bridge plate 16. The lower ends of the screws are threaded into the brackets 60, and heads 61 on the screws bear upon bowed portions of the spring wish-bone. The pressure of the wiper 19 on the track 20 is adjusted by turning the screws one way or the other in the bracket 60.

At the apex of the tapered portion 12 of the support plate 11 is a down-turned lug 30 having a screw-threaded hole to receive a pivot pin 31 for a cam follower. This cam follower is in the form of a bell crank 32 pivoted at the angle. One arm 33 of the bell-crank is adapted to engage one side of the projecting ear 18 on the plate 11. The tip of the other arm 34 rides upon the surface of a stationary cam ring 35 fitted concentrically with the spindle.

The cam ring is made of flexible strip metal, and is carried by an annular series of screws 36 (only a few are shown) which are screw-threaded into a stationary base plate 37. The ring is located between heads 63 and flanges 64 on the screws. When one of the screws 36 is turned, the level of the adjoining portion of the cam ring is raised or lowered relatively to the rest of the cam ring, the ring flexing to accommodate this movement of the screw.

A coil tension spring 37 connected between a boss 38 on the bridge 16 and a boss 39 on the support plate 11 acts resiliently to hold the ear 18 against the crank arm 33.

As the spindle 10 is turned to adjust the resistance, the cam follower arm 34 rides over the cam 35 through a corresponding angle. Assuming that at some point in the range there is a discrepancy between the scale reading and the actual resistance, produced as by inaccuracy in winding of the coil, one or more of the screws 36 at that portion of the cam ring adjacent the position of the cam follower 34 is turned so as to adjust the level of the cam track at this position. Thus, if the actual resistance is less than that shown on the scale, and increase in resistance of the component is obtained by turning the spindle 10 in a clockwise direction, as viewed in Figure 1, one or more of the screws 36 adjacent the riding portion of the cam follower 34 is turned in a direction such that the level of the adjoining cam ring is raised. The tip of the cam follower is thus raised, and the bell-crank 32 turns about its pivot pin 31 (anti-clockwise in Figure 2), taking up the new position shown in chain lines. The consequent movement of the bell-crank arm 33 acts on the ear 18 to swing the bridge in a clockwise direction (Figure 1).

If the actual resistance is greater than the normal resistance shown on the scale, the screw or screws 36 are turned in the opposite direction so as to lower the adjacent portion of the cam ring.

In consequence, the cam follower acts on the ear 18 of the bridge 16 to move the bridge in a tangential direction at the ends of the arms 15, which flex to accommodate this moveemnt. As a result, the contact finger 19 is advanced around the resistance track relatively to the spindle. The resistance is thus increased for the particular setting of the spindle. The spring 37 acts to hold the finger in its corrected position.

Such a device involves the use of only the one pivot 31 for the cam follower. The support 11 and the bridge plate 16 may be made as simple stampings. The strip-metal arms 15 afford a rigid connection between the two plates in the axial direction of the spindle.

The construction of correction device shown in Figures 4 and 5 is of lighter construction but similar in principle. The support plate 11 is tapered for substantially its full length, and it has an arched recess 40 at the back. The bridge 16 is formed with integral and rigid arms 41 that pass under the flexible and resilient side arms 15. The side arms are fitted with insulation blocks 42 secured by screws 43. This arrangement avoids the necessity for the insulation yoke 24. The wiper finger 19 is fixed at the mid-point of a bowed member 44 of resilient sheet metal which corresponds in function to the wish-bone 21. The member 44 is secured at its ends by eyelets 45 to the blocks 42. Additional screws 26 threaded into the blocks bear on the bowed member 44 and serve as a means to adjust the pressure exerted by the bowed member on the contact finger. The pick-up arms 27 are formed integrally on the ends of the bowed member 44. As with the previous construction, they bear on the cylindrical surface of a slip ring 23.

Figures 6 and 7 show a modification of the construction in Figures 1 and 2. The pick-up members 27 are replaced by a pair of bow-shaped members 50 of resilient sheet metal which are fixed at their ends by screws 51 to posts 52 at the underside of the insulation yoke 24. The mid portions of the bowed pick-up members carry contacts 65, 66 that bear on the flat face of a slip ring 53 (i. e. in the axial direction of the spindle 10).

I claim:
1. A variable electrical impedance component of the type described, comprising the combination of an impedance track, a wiper contact on a mounting which is connected to a support fixed on a movable control member for imparting sliding movement of the wiper contact along the track, the connection between the mounting and the support consisting of a flexible link which is fixed to the two parts and is such as to permit a limited corrective movement in either direction of the wiper contact along the track relatively to the control member, the said flexible link comprising an assembly of a pair of spaced flexible arms arranged side by side substantially in parallel, one end of the assembly being rigidly fixed to the support member on the control member, and the ends of the arms at the other end of the assembly being rigidly fixed to a bridge member serving as the mounting for the movable component part, a cam track in parallel with the path of the support on the control member, and a cam follower carried by that support which rides along the cam track on movement of the control member and which is coupled to the wiper contact mounting for producing corrective movement of the wiper contact in accordance with the cam contour.

2. A variable electrical impedance component of the type described, comprising the combination of an annular impedance track, a rotary wiper contact on a mounting connected to a support consistin go fa flexible link which is fixed a spindle for imparting a rotary movement of the slider contact to slide it around the track, the connection between the mounting and the support consisting of a flexible link which is fixed to the two parts and which is such as to permit a limited angular corrective movement of the slider contact relatively to the spindle, an annular cam track concentric with the spindle, the said flexible link comprising an assembly of a pair of spaced flexible arms arranged side by side substantially in parallel, one end of the assembly being rigidly fixed to the support member on the spindle control member, and the ends of the arms at the other end of the assembly being rigidly fixed to a bridge member serving as the mounting for the movable component part, and a cam follower carried by the support on the spindle which rides along the cam track on rotation of the spindle and which is coupled to the wiper contact mounting for producing corrective movement of the wiper contact in accordance with the cam contour.

3. A variable impedance component as claimed in claim 1, wherein the flexible link comprises an assembly of a pair of spaced flexible arms arranged side by side substantially in parallel, one end of the assembly being rigidly fixed to the support member on the control member, and the ends of the arms at the other end of the assembly being rigidly fixed to a bridge member serving as the mounting for the movable component part.

4. A variable impedance component as claimed in claim 1, which incorporates spring means for returning the mounting for the movable part from its corrective position.

5. A variable impedance component as claimed in claim 1, wherein the arms are made resilient so as also to act as spring means for returning the mounting for the moving part from its corrective position.

6. A variable impedance component as claimed in claim 3, wherein the cam follower is afforded by one arm of a double-armed lever pivoted adjacent the angle on the support member and having its other arm in engagement with one side of an ear projecting from the bridge member.

7. A variable impedance as claimed in claim 3, wherein the wiper contact is fixed intermediate the ends of a resilient beam member secured at its ends to the mounting so that the wiper contact bears resiliently on the impedance track.

RICHARD FRANCIS COLLINSON.

References Cited in the file of this patent
UNITED STATES PATENTS

| Number | Name | Date |
|---|---|---|
| 2,068,166 | Dodge | Jan. 19, 1937 |